United States Patent [19]
Lomax et al.

[11] Patent Number: 5,946,931
[45] Date of Patent: Sep. 7, 1999

[54] EVAPORATIVE COOLING MEMBRANE DEVICE

[75] Inventors: Curtis Lomax, Sunnyvale; John Moskito, Castro Valley, both of Calif.

[73] Assignee: The United States of America as represented by the Administrator of the National Aeronautics and Space Administration, Washington, D.C.

[21] Appl. No.: 09/030,101

[22] Filed: Feb. 25, 1998

[51] Int. Cl.⁶ .................................................. F25D 25/00
[52] U.S. Cl. ................................ 62/304; 62/309; 62/315; 261/101; 261/100; 261/DIG. 3
[58] Field of Search ............................. 62/304, 309, 315; 261/101, 100, DIG. 3

[56] References Cited

U.S. PATENT DOCUMENTS

| | | |
|---|---|---|
| 2,182,788 | 12/1939 | Cornell, Jr. . |
| 2,766,597 | 10/1956 | Gieck . |
| 3,170,303 | 2/1965 | Rannenberg et al. . |
| 3,197,973 | 8/1965 | Rannenberg et al. . |
| 3,613,775 | 10/1971 | Curtis . |
| 4,007,601 | 2/1977 | Webbon . |
| 4,824,741 | 4/1989 | Kunz .......................................... 429/26 |
| 4,833,896 | 5/1989 | Carlson ...................................... 62/304 |
| 4,917,301 | 4/1990 | Munteanu . |
| 5,263,336 | 11/1993 | Kuramarohit . |
| 5,309,649 | 5/1994 | Bergmann et al. . |
| 5,368,786 | 11/1994 | Dinauer et al. . |
| 5,517,700 | 5/1996 | Hoffman . |
| 5,552,023 | 9/1996 | Zhou . |
| 5,606,868 | 3/1997 | Calvert ...................................... 62/315 |

*Primary Examiner*—Henry Bennett
*Attorney, Agent, or Firm*—Robert M. Padilla; Harry Lupuloff; John Mannix

[57] ABSTRACT

An evaporative cooling membrane device is disclosed having a flat or pleated plate housing with an enclosed bottom and an exposed top that is covered with at least one sheet of hydrophobic porous material having a thin thickness so as to serve as a membrane. The hydrophobic porous material has pores with predetermined dimensions so as to resist any fluid in its liquid state from passing therethrough but to allow passage of the fluid in its vapor state, thereby, causing the evaporation of the fluid and the cooling of the remaining fluid. The fluid has a predetermined flow rate. The evaporative cooling membrane device has a channel which is sized in cooperation with the predetermined flow rate of the fluid so as to produce laminar flow therein. The evaporative cooling membrane device provides for the convenient control of the evaporation rates of the circulating fluid by adjusting the flow rates of the laminar flowing fluid.

7 Claims, 4 Drawing Sheets

EVAPORATIVE COOLING MEMBRANE DEVICE

ORIGIN OF THE INVENTION

The invention described herein was made in the performance of work under a NASA contract and subject to the provision of Section 305 of the National Aeronautics and Space Act of 1958, Public Law 85-568 (72 Stat. 435; 42 U.S.C. 2457).

BACKGROUND OF THE INVENTION

A. Field of the Invention

The invention relates to a device used to cool a contained stream of fluid by means of evaporation, and more particularly, to a device that provides a heat sink for cooling fluids and which is suitable for operation in high altitude environment situations, such as in outer space.

B. Description of the Prior Art

Many attempts for providing heat sink devices for use in conjunction with a variety of environments are known. One such heat sink device, which is particularly suitable for operations in high altitude environment situations, is disclosed in U.S. Pat. No. 4,007,601 ('601) which is herein incorporated by reference. The '601 patent discloses a sublimator/evaporator system in which liquid flows around the outside of tubes, while the tube interior is vented directly to a vacuum. A portion of the liquid experiences a liquid to vapor change releasing latent heat therefrom and leaving the remaining fluid cooled to serve as a medium for heat sinking purposes. The sublimator/evaporator system of the '601 patent serves well its intended purpose and if sized correctly provides proper control of the cooling rate. However, the system of the '601 patent is disadvantageously limited because the flow rate is limited by the internal orifice size of each tube and, therefore, does not make advantageous use of the full surface area employed in the construction of the device. It is desired that an evaporative cooling device be provided that advantageously takes advantage of the full surface area employed in its construction and yet not reduce its cooling capabilities.

SUMMARY OF THE INVENTION

The present invention is directed to an evaporative cooling device that does not suffer from tubular flow rate limitations, but rather has a plate configuration which allows for increased flow rates and that provides convenient control of evaporation rates of the device by adjusting the rate of flow of the fluid that yields the cooling effect.

The evaporative cooling membrane device provides for cooling with a circulating stream of fluid by means of evaporation. The evaporative cooling device comprises a housing with four enclosed sidewalls, an enclosed bottom, and an exposed face covered with at least one sheet of hydrophobic porous material preferably having a relatively thin thickness so as to serve as a membrane. The sidewalls include two oppositely disposed sidewalks one with an entrance opening and the other with an exit opening, and with the entrance opening capable of receiving a fluid commonly having an elevated temperature, a predetermined flow rate, and capable of experiencing a liquid to vapor change, and the exit opening capable of passing the fluid out of the housing. The predetermined flow rate is selected so that laminar flow is maintained from the entrance to the exit opening. The porous membrane material has pores with predetermined dimensions so as to resist the fluid in its liquid state from passing therethrough, but to allow passage of the fluid in its vapor state thereby causing the evaporation of the fluid. The evaporation cools the fluid remaining in the housing and the cooled fluid is directed from the evaporative cooling membrane device to serve for heat sinking purposes.

DETAILED DESCRIPTION OF THE PREFERRED EMBODIMENTS

Figure 1:
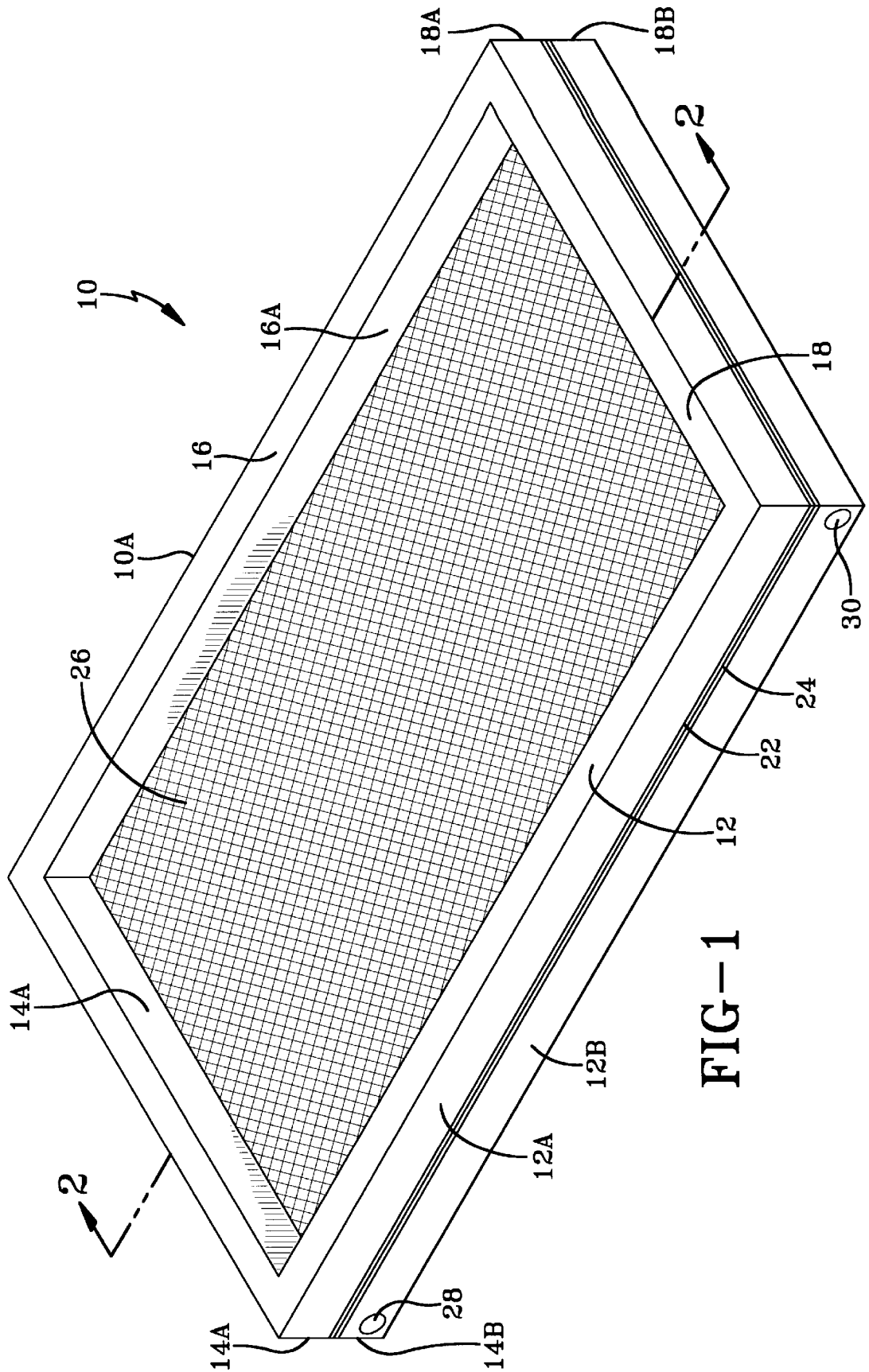
FIG. 1 is an isometric illustration of the evaporative cooling membrane device of the present invention.

Referring to the drawings, wherein the same reference numbers indicate the same elements throughout, there is shown in FIG. 1 an isometric illustration of an evaporative cooling membrane device 10 of the present invention that provides for cooling with a circulating stream of fluid by means of evaporation. The evaporative cooling membrane device 10 provides for a channel that creates a laminar flow of its fluid. The fluid is circulated within a closed container cooperating with the device 10 so that the fluid encounters a liquid to vapor change causing evaporation thereof, thereby, freeing the liquid of latent heat and leaving behind a cooled remaining fluid.

The evaporative cooling membrane device 10 comprises a housing 10A with four enclosed sidewalls 12, 14, 16 and 18 which, in turn, respectively comprise upper and lower halves 12A and 12B; 14A and 14B; 16A and 16B (not shown) and 18A and 18B. If desired, the upper and lower halves of the enclosed sidewalls may each be one unitary piece. More particularly, the upper halves 12A, 14A, 16A and 18A may be constructed as one piece and, similarly, the lower halves 12B, 14B, 16B and 18B may be constructed as one piece. The housing 10A further comprises an enclosed bottom 20 not shown in FIG. 1, but to be described with reference to FIG. 2.

The evaporative cooling membrane device 10 further comprises a hydrophobic porous membrane 22, a gasket 24, and a restraint layer 26 shown as having a dimpled surface. The restraint layer 26 provides support of the hydrophobic porous membrane 22 while at the same time allows vapor to pass therethrough. Further, the evaporative cooling membrane device 10 further comprises an entrance opening 28 and an exit opening 30 respectively located on oppositely disposed sidewall halves 14B and 18B, and which may be further described with reference to FIG. 2 which is a view taken along line 2—2 of FIG. 1.

Figure 2:
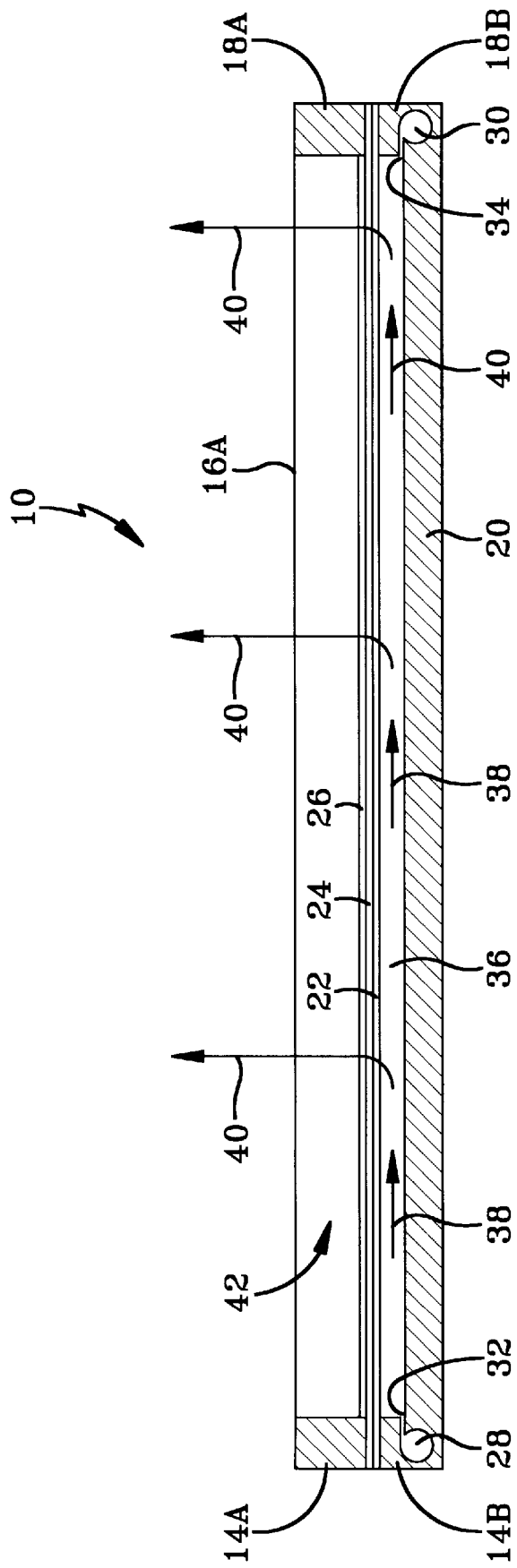
FIG. 2 is a sectional view of the device of FIG. 1 taken along section line 2—2 of FIG. 1.

As seen in FIG. 2, the entrance 28 and exit 30 openings respectively have narrowed passageways 32 and 34 that lead into and out, respectively, of a channel 36 which spans the majority of bottom or floor 20 of the evaporative cooling membrane device 10. The channel 36 carries the fluid delivered to the evaporative cooling membrane device 10 selected from the group comprising water and a refrigerant. The fluid flows in a laminar flow regime. The size of the cross section of the channel 36 is selected to be large enough that at maximum flow of the fluid the Reynold Number (Re) is below 2000. The Reynold Number (Re) may be expressed by relationship (1):

$$R_e = \frac{D_e v \rho}{\mu g_c} \quad (1)$$

where $D_e$ is the equivalent diameter of channel 36, v,ρ and μ are the velocity, density and viscosity, respectively, of the fluid and $g_c$ is the gravitational constant that the fluid experiences.

The fluid has a predetermined range of a flow rate with upper and lower limits, and the channel 36 is sized so that the laminar flow occurs within the channel 36 even when the upper limit is selected for the flow rate of the fluid. The laminar flow of the fluid is depicted by directional arrows 38 and the fluid flows on one side, that is, the underside of the hydrophobic porous material 22. As seen in FIG. 2, both the hydrophobic porous material 22 and the gasket 24 are wedged between the oppositely disposed sidewalls 14 and 18 and extend therebetween with the restraint layer 26 comprised of wire mesh covering the porous material. The gasket 24 lies only between the side walls 14 and 18.

The hydrophobic porous material 22 may be teflon, such as PTFE and has an upper surface exposed to a vacuum as to be described and an undersurface near the flowing fluid. The hydrophobic porous material 22 has predetermined dimensions such that its pores comprise diameters preferably in the range from 0.5 μm to 0.05 μm. The hydrophobic porous material for one particular application is selected to have a thickness in the range of 0.100 inches to 0.001 inches so as to serve as a membrane having thin and pliable characteristics. Other applications contemplated by the present invention may have different preferred ranges of pores as well as thicknesses.

The fluid flowing in channel 36 is capable of experiencing a liquid to vapor change. The porous membrane 22 is selected to have pores with predetermined dimensions so as to resist fluid in its liquid state from passing therethrough, but to allow the passage of the fluid in its vapor state, thereby, causing evaporation of the fluid as indicated by directional arrows 40 escaping into region 42. The interconnection of the fluid flowing in channel 36, as well as the system in which the evaporative cooling membrane device 10 may be lodged, may be further described with reference to FIG. 3.

Figure 3:
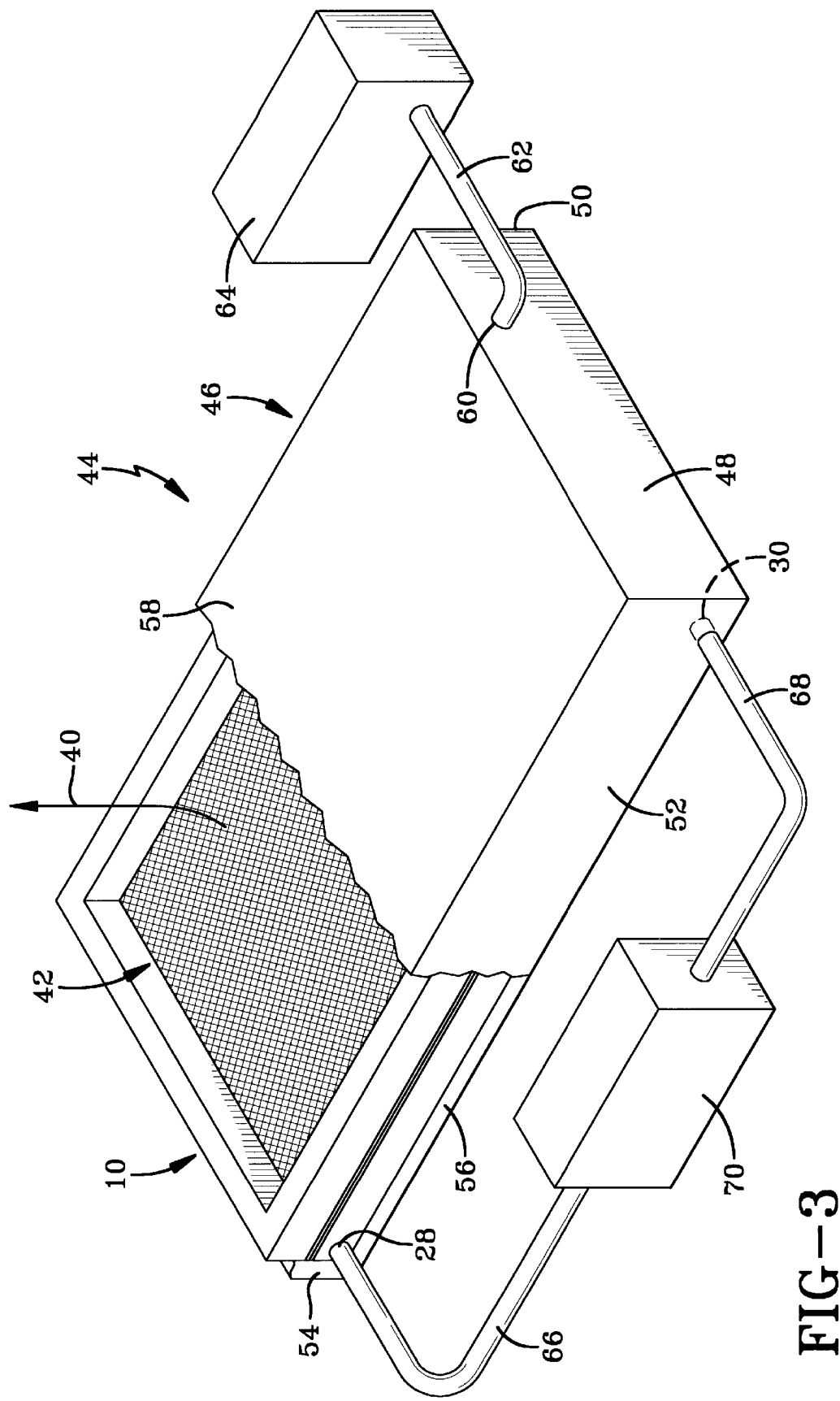
FIG. 3 is an isometric illustration, partially cut away, of a system employing the evaporative cooling membrane device of FIG. 1.

FIG. 3 illustrates an evaporative cooling membrane system 44, which in addition to the evaporative cooling membrane device 10 of FIG. 1, comprises a container 46 having sidewalls 48, 50 (not fully shown), 52, and 54, a floor 56, and a top 58. FIG. 3 illustrates the container 46 as being partially cut away so as to expose, and illustrate therein, the evaporative cooling membrane device 10, especially, the region 42 that captures the escaping vapors 40. In actuality, the region 42 is formed between the opening of the unit 10 enclosed by the porous membrane 22 and, preferably, the restraint layer 26, and the top 58 of the container 46. As seen in FIG. 3, the floor 56 of container 46 has complementary dimensions relative to the floor 30 (not shown) of the evaporative cooling membrane device 10 so that the evaporative cooling membrane device 10 preferably snugly rests thereon.

As further seen in FIG. 3, the container 46, more particularly, the region 42 that captures the escaping low pressure vapors 40 is connected, via an opening 60 in a container 46 and a duct 62, to a source 64 which is a source of negative pressure, that is, a vacuum; whereas, the entrance and exit openings 28 and 30 of the evaporative cooling membrane device 10 are connected, via ducts 66 and 68 respectively, to a source 70 which is a source of fluid or liquid that is capable of experiencing a vapor change. The source 64 may maintain a pressure of less than 4 Torr. and the source 70 may supply a fluid having a flow rate appropriate to internal dimensions of evaporative cooling membrane 10. In one application of the present invention related to a space suit, the mass flow rate is one-half (½) gallon/min or 240 lbs./Hr. Furthermore, in this space suit application the housing 46 and source 64 may be replaced by an open vacuum of space.

OPERATION OF THE EVAPORATIVE COOLING MEMBRANE SYSTEM

The operation of the present invention may be better appreciated by first describing prior art evaporative cooling devices. Prior art devices of particular importance to the present invention may begin with a flat or pleated sheet of material, such as PTFE (teflon) that has some pores in it that are small enough to prevent liquid water from passing through, but large enough that water vapor will pass through. These prior art cooling devices put liquid water on one side of this membrane and a space like vacuum on the other. The result is such that some water evaporates and goes through the membrane. The remaining water will be cooled by this evaporation, just as evaporated sweat cools the human body. The amount of cooling is $(h_v m_e)$ the latent heat of evaporation $(h_v)$ times the mass $(m_e)$ of $H_2O$ evaporated. If this process is allowed to continue the liquid mass will cool and freeze, then it will sublime until there is not enough heat in it to evaporate more ice and, thus, prevent the desired cooling to be accomplished.

The present invention eliminates this limitation by making fluid, such as fresh warm water, flow over the surface of the membrane 22. In this way fresh warm water is always supplied to the membrane 22. The water, serving as the fluid, does not freeze, just as it is difficult to freeze a moving creek. But the net effect of cooling still takes place and if, unlike the present invention, it were a closed system there would eventually be freezing. In the present invention heat is added to the system. Thus, the present invention provides a balance between heat in and heat out so that no freezing occurs and flow continues.

Figure 4:
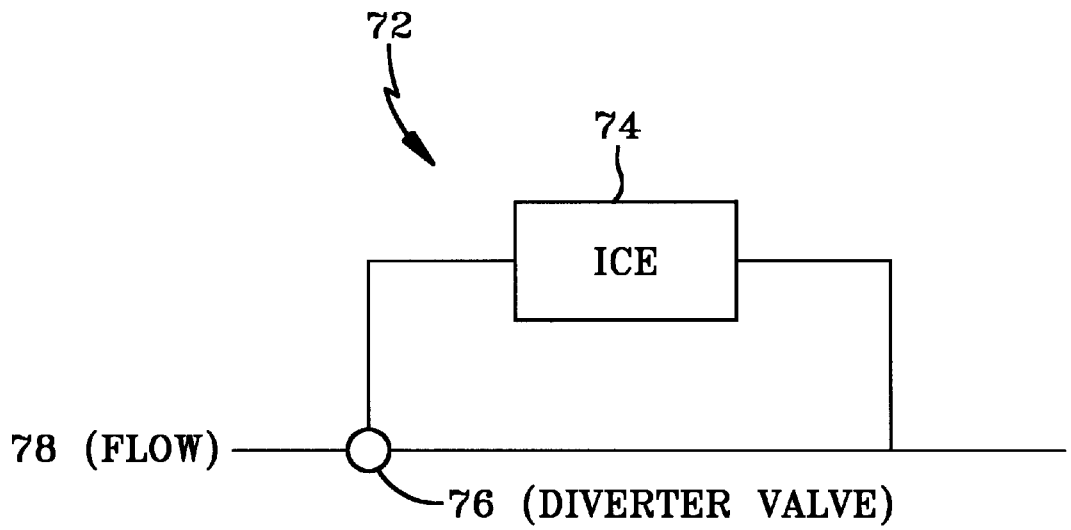
FIG. 4 is a schematic illustration related to one embodiment of the invention.

In one application, illustrated in FIG. 4 as arrangement 72, related to NASA, an ice block 74 for cooling is arranged in conjunction with a by pass or diverter valve 76 for control of the fluid 78. In the arrangement 72 of FIG. 4, the water cools near the pores of a membrane sheet and the evaporation rate drops because the rate of cooling is directly related to the temperature of the fluid or more accurately, the vapor pressure of the fluid. In the present invention, the flow is laminar and the water (fluid) near the wall, such as the underside of membrane 22, moves very slowly. Laminar flow can be envisioned as a bunch of thin sheets of water being pushed over the membrane 22. The sheets of water near the wall, such as the underside of membrane 22, see friction and are slowed. The next upward sheet (relative to the lower sheet encountering friction) of water moves faster and so on for all of the sheets of water flowing in the evaporative cooling membrane device 10 of the present invention. There is very little mixing of the sheets or layers of water and if there is a temperature difference, the heat will be transferred between the sheets of water by conduction not convection through the sheets of water. Also, any temperature difference will enhance the sheet or layering model. However, if the flow speeds up and goes into the turbulent type, the layers break down and heat is transferred via convection. It is of particular importance that the flow of the fluid be in the laminar flow regime. If the flow is turbulent then there is no temperature reduction near the wall, such as the underside of membrane 22, and evaporation will be at its highest. However, in accordance with the present invention with the flow being laminar, the cooling membrane 10 controls the speed of the layer near the wall, such as the underside of membrane 22, and thus the temperature and thus the vapor pressure and thus the evaporation rate of the device 10.

Figure 5:
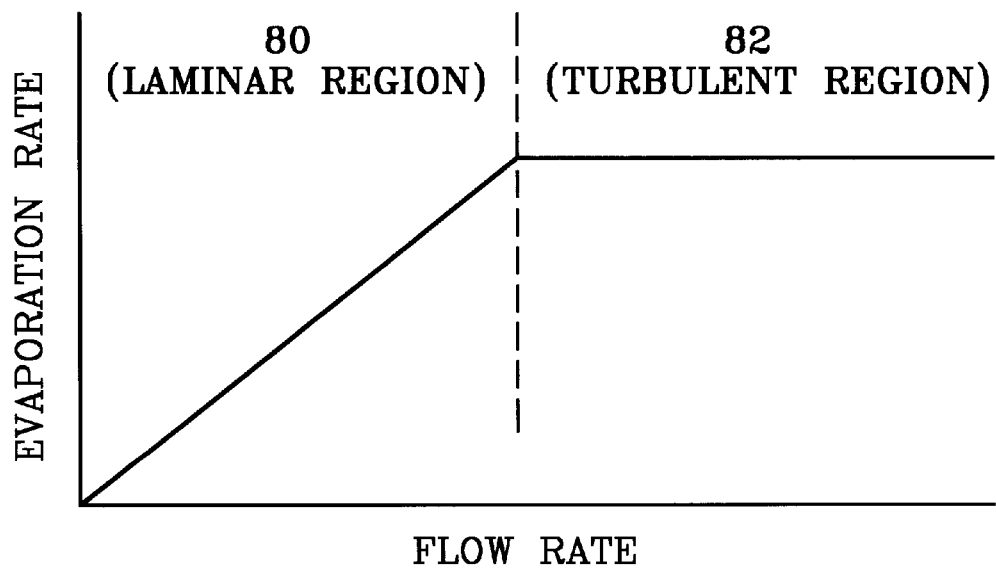
FIG. 5 is an illustration showing the linearity between the flow and evaporation rates in the laminar flow region related to the present invention.

Low flow rates means low velocity near the pores of membrane 22 which means low temperature near the pores which, in turn, means the evaporation rate slows as the temperature drops. Increasing the flow rate of the fluid and increasing the temperature of the warm moving fluid both correspondingly increase the evaporation rate. Therefore, high flow rate equals high evaporation rate; low flow rate equals low evaporation rate; and evaporation equals cooling. These, desired relationships, unlike the present invention, no longer exist if the flow enters the turbulent regime as may be seen in FIG. 5. As seen in FIG. 5, the flow rate and evaporation rate have a linearly increasing relationship in a laminar region 80 and, conversely, a non-increasing relationship in a turbulent region 82.

In a laminar flow region, flow velocity near the wall, that is, the underside of membrane 22 of the cooling membrane device 10 does not change and evaporation is relatively constant.

The operation of the evaporative cooling membrane device 10 and thus the evaporative cooling membrane system 44 is determined by the combination of heat and mass transfers around and through the device 10 and which consists of four definable processes which are: (1) the transfer heat to the site of evaporation; (2) the transfer of mass to the site of evaporation; (3) the evaporation of mass from the site of evaporation; and (4) the flow of vapor out of the device 10. All of these four processes are important to the operation of the present invention. The interrelationships between these four processes may be expressed by the following relationship:

$$\dot{m}C_p(T_{in}-T_{out})=hA(T_b-T_w)=h_v m_e \quad (2)$$

where $\dot{m}$=mass flow; $C_p$=heat capacity; $T_{in}$=temperature of bulk water into device 10; $T_{out}$=temperature of bulk water out of device 10; h=heat transfer coefficient; A=surface area of the cooling membrane 10 from which vapors 40 escape; $T_b$=average bulk temperature of fluid in device 10; $T_w$=temperature underside of the membrane 22 of the cooling device 10; $h_v$=latent heat of evaporation; and $m_e$=mass evaporated.

The term $m_e$ is determined by the material 22 and by the vapor pressure difference between the water and the vacuum side of the membrane which may be expressed as:

$$m_e=\alpha(P_w-P_v) \quad (3)$$

where $\alpha$ is the kinetic coefficient of evaporation and has a typical value of 0.025 lbs./hr • psi • in² for a material 22 such as PTFE (teflon); $P_w$ is the vapor pressure of the fluid such as water; $P_v$ is pressure on the vacuum side of the membrane 22; and $m_e$ is proportional to the vapor pressure difference as well as being dependent on the temperature of the fluid moving through the cooling membrane 10.

It should now be appreciated that the practice of the present invention provides for an evaporative cooling membrane device, as well as an evaporative cooling membrane system, that provides cooling of a fluid that is capable of experiencing a liquid to vapor transition and that manifests a laminar flow that allows for the evaporation to be easily adjusted by the flow rate thereof.

It is understood that the invention is not limited to the specific embodiments herein illustrated and described, but may be used otherwise without departing from the spirit and scope of the invention.

What we claim is:

1. A system for cooling a contained environment with a circulating stream of fluid by means of vaporation comprising:

a) a housing with four enclosed side walls, an enclosed bottom, and an exposed face covered with at least one sheet of hydrophobic porous material of teflon of the PTFE type, said side walls including two oppositely disposed side walls one with an entrance opening and the other with an exit opening and with entrance opening capable of receiving a fluid having an elevated temperature and a predetermined flow rate and capable of experiencing a liquid to a vapor change and the exit opening capable of passing said fluid out of said housing, said predetermined flow being selected so that laminar flow is maintained from said entrance opening to said exit opening, said porous material having pores with predetermined dimensions so as to resist any fluid in its liquid state from passing therethrough but to provide passage of said fluid in its vapor state causing the evaporation of said fluid;

b) a container defining said confined environment and capable of containing a negative pressure, said container having means for holding said housing so that said porous material is exposed to said negative pressure.

2. A system for cooling with a circulating stream of fluid by means of evaporation comprising:

a housing with four enclosed side walls, an enclosed bottom, and an exposed face covered with at least one sheet of hydrophobic porous material of teflon of the PTFE type, said side walls including two oppositely disposed side walls one with an entrance opening and the other with an exit opening and with entrance opening capable of receiving a fluid having an elevated temperature and a predetermined flow rate and capable of experiencing a liquid to a vapor change and the exit opening capable of passing said fluid out of said housing, said predetermined flow being selected so that laminar flow is maintained from said entrance opening to said exit opening, said porous material having pores with, predetermined dimensions so as to resist said fluid in its liquid state from passing therethrough but to allow passage of said fluid in its vapor state causing the evaporation of said fluid; said pores material having inner and outer surfaces with the outer surface being arranged to be exposed to a negative pressure.

3. The system for cooling according to claim 1, wherein said predetermined dimensions of said pores comprise a diameter in the range from 0.1 μm to 0.5 μm.

4. The system for cooling according to claim 2, wherein said predetermined dimensions of said pores comprise a diameter in the range from 0.1 μm to 0.5 μm.

5. The system according to claim 2, wherein said hydrophobic material has a selected thickness so as to comprise a membrane.

6. The system according to claim 1, wherein the vapor state of said fluid passing through and evaporating from said pores creates a combination of heat and mass transfer around and through said housing to provide four definable processes which are: (1) transfer of heat to the site of each of said pores of said evaporation; (2) the permeation of mass to the site of each of said pores of said evaporation; (3) the evaporation of mass from the site of each pore of said evaporation; and (4) the flow of vapor from the site of each pore of said evaporation.

7. The system according to claim 2, wherein the vapor state of said fluid passing through and evaporating from said pores creates a combination of heat and mass transfer around and through said housing to provide four definable processes which are: (1) transfer of heat to the site of each of said pores of said evaporation; (2) the permeation of mass to the site of each of said pores of said evaporation; (3) the evaporation of mass from the site of each pore of said evaporation; and (4) thus flow of vapor from the site of each pore of said evaporation.

\* \* \* \* \*